No. 729,103. PATENTED MAY 26, 1903.
J. S. STONE.
METHOD OF ELECTRICAL DISTRIBUTION AND SELECTIVE DISTRIBUTION.
APPLICATION FILED JULY 10, 1902.
NO MODEL. 2 SHEETS—SHEET 1.
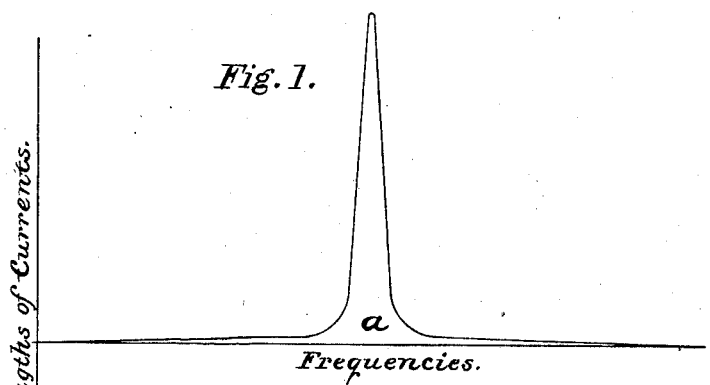
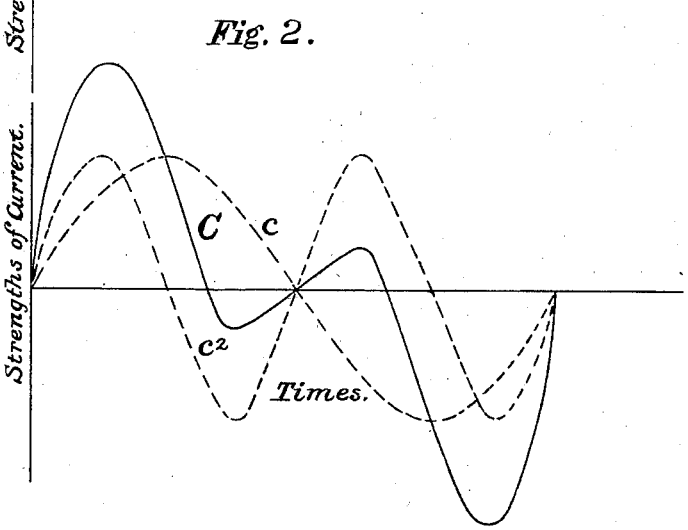
WITNESSES: INVENTOR.

No. 729,103. PATENTED MAY 26, 1903.
J. S. STONE.
METHOD OF ELECTRICAL DISTRIBUTION AND SELECTIVE DISTRIBUTION.
APPLICATION FILED JULY 10, 1902.
NO MODEL. 2 SHEETS—SHEET 2.
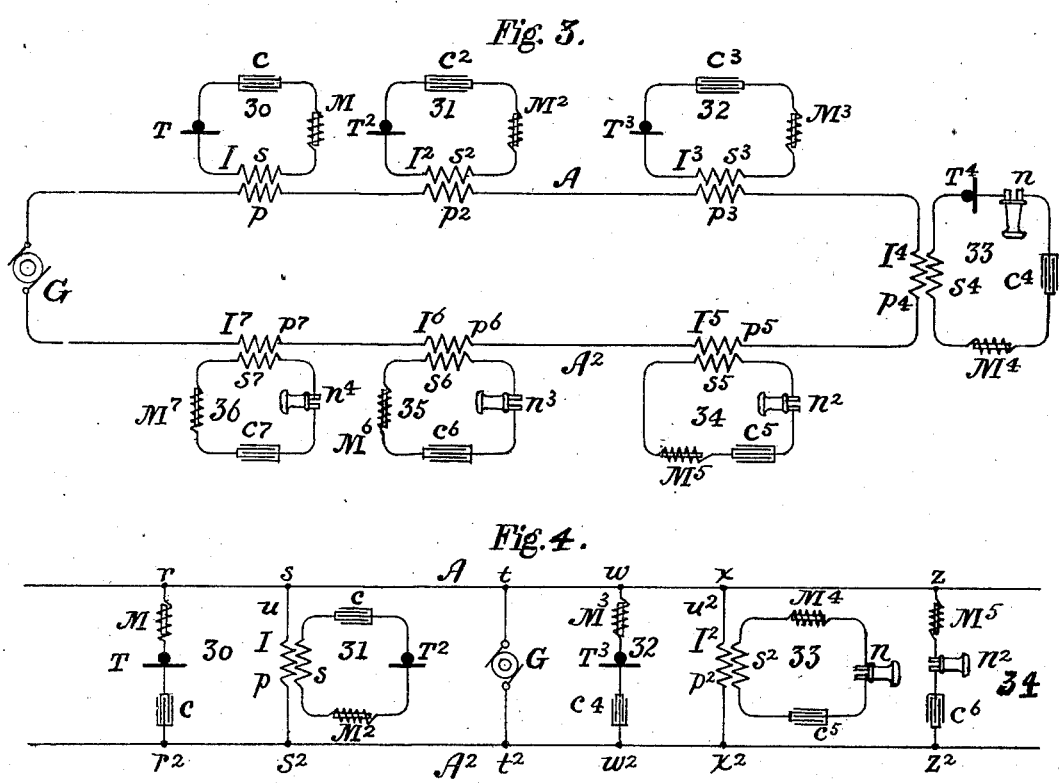
WITNESSES:
INVENTOR.

No. 729,103. Patented May 26, 1903.

UNITED STATES PATENT OFFICE.

JOHN STONE STONE, OF CAMBRIDGE, MASSACHUSETTS, ASSIGNOR TO THE AMERICAN BELL TELEPHONE COMPANY, A CORPORATION OF MASSACHUSETTS.

METHOD OF ELECTRICAL DISTRIBUTION AND SELECTIVE DISTRIBUTION.

SPECIFICATION forming part of Letters Patent No. 729,103, dated May 26, 1903.

Original application filed April 4, 1894, Serial No. 506,316. Divided and this application filed July 10, 1902. Serial No. 115,056. (No model.)

*To all whom it may concern:*

Be it known that I, JOHN STONE STONE, residing at Cambridge, in the county of Middlesex and State of Massachusetts, have invented certain Improvements in Methods of Electrical Distribution and Selective Distribution, of which the following is a specification.

This invention comprises methods of electrical selection, analysis, and distribution. By means of these methods vibratory electromotive forces or electric currents of different frequencies or rates of vibration simultaneously impressed upon an electric circuit may be individualized and selectively utilized, regulated, absorbed, or distributed.

The invention, its results, and objects are founded upon certain electrical phenomena which closely resemble those known as "resonance" in acoustics.

As an acoustical resonator may be so designed as to respond but feebly to all sound-vibrations except such as correspond to a given and predetermined critical pitch or rate of oscillation, so an electric circuit may be proportioned in such a way that its responses to all harmonic electric vibrations except those of a given critical frequency or rate of oscillation will also be extremely feeble. When a harmonically-vibratory electromotive force is impressed upon such a circuit, (which for convenience may be called a "resonator-circuit,") everything else remaining the same, the resulting current in such circuit depends on the frequency, for there is a critical frequency at which the said current is at a maximum, and any change in the frequency from this point in either direction produces a decreased resulting current. This property of resonance depends upon the simultaneous presence in the circuit of electrostatic and electromagnetic capacity, and in order that an electric circuit may have appreciable resonance it is requisite that it possess sufficient electrostatic and electromagnetic capacity to hold in the form of electrification and electromagnetism an appreciable amount of electrical energy supplied to it.

In my system I effect the distribution and regulation of a plurality of vibratory electric currents impressed upon a main circuit by associating with such main circuit a plurality of resonator-circuits of the character and constitution indicated, each organized and proportioned to select that particular current of the series to which it is responsive or under which it becomes operative. By suitably proportioning the capacities, inductances, and resistances of these resonator-circuits I am able to make them individually responsive to impressed electromotive forces of any desired frequency or rate of vibration. The impedance presented by such circuits to the passage of alternating currents depends upon the frequency of said current, it being lowest when the said frequency is or is approximately that to which the resonator-circuit is designed to respond, and it increases rapidly as the frequency is increased or decreased from that value.

In the operation of the system each resonator-circuit selects from the electromotive forces impressed upon the main circuit that particular one to which it is designed to respond, and a current is developed thereby in any given resonator-circuit, which current is not materially or appreciably interfered with by the currents produced in any of the other circuits.

The invention may be utilized by several methods. It may, for example, be used for the purposes of individual or selective signaling or multiplex telegraphy, and to that end I place signal-receiving apparatus in each of the groups of resonator-circuits, and employing currents of different frequencies the signals are sent and are received on the apparatus of the resonator-circuits, respectively, either simultaneously or not, without mutual interference. The invention is not, however, restricted to distribution, telegraphy, or selective signaling in one direction only, but is also adapted to reciprocal transmission between a terminal station and a series of way-stations or between any two stations located at any points on a main circuit. If for selective signaling, multiplex telegraphy, or other useful purposes it be desired to individually regulate, vary, and absorb alternating currents of different frequencies simultaneously impressed upon a main or signaling circuit, it may be accomplished by associating one or more resonator-circuits with said main circuit, which when their resistance, capacity, or inductance is altered will selectively react on the several currents, varying, regulating, and absorbing them, and, if desired, such changes effectuated in one of two or more similarly-proportioned resonator-circuits may produce signals corresponding to such changes in connection with the remainder of such similar circuits.

Thus far I have referred to a number of impressed vibratory electromotive forces of different frequencies; but such an arrangement is not essential, for a single vibratory electromotive force, provided it is not of a simple harmonic character, may be impressed upon a circuit in a manner well understood and is capable of exciting currents of different frequencies, respectively, in several resonator-circuits, just as a compound tone is capable of exciting the sonorousness of several acoustical resonators attuned to the different pitches composing the said tone.

We may consider a vibratory electromotive force which is not of a simple harmonic character as a compound of the several harmonic electromotive-force vibrations, which when summed will produce the same form of wave. In this invention, therefore, it is not necessary that for the operation of each associated resonator-circuit there shall be impressed a separate vibratory electromotive force, and where it is more convenient a compound vibratory electromotive force (by which I mean one capable of being resolved or analyzed into a plurality of simple harmonic components) may be used.

In the drawings which illustrate this specification, Figure 1 is a curve drawn to rectangular coördinates, indicating graphically the variation, with the frequency, of the current in a resonator-circuit, the mean value of the impressed electromotive force remaining constant. Fig. 2 is also a curve drawn to rectangular coördinates, showing how an irregular vibration (indicated by the full-line curve) may be the sum of two regular harmonic components, (indicated by the dotted lines.) Fig. 3 shows an arrangement for selective signaling or multiplex telegraphy in which a number of resonator-circuits are associated in series with a main signaling or supply circuit, some of the resonator-circuits including transmitters and being organized to work in harmony with other similarly-proportioned resonator-circuits containing receiving translating devices, and vice versa. Fig. 4 is a similar arrangement in which the resonator-circuits are associated in parallelism or in multiple arc with one another on the main or supply circuit.

In the curve of Fig. 1 the ordinates represent the current strengths, and the abscissæ the frequency or number of vibrations per unit of time. The curve is supposed to indicate the current in a resonator-circuit so proportioned that its maximum current is developed with a frequency of $a$, the said current being reduced when the frequency is either greater or less, the figure of course being purely illustrative.

In Fig. 2 the full-line curve C represents the sum of the two regular harmonic component broken-line curves $c$ and $c^2$.

Assuming that a compound vibratory current is impressed on the main circuit A $A^2$ and that the capacities and inductances of each of these resonator-circuits have been so proportioned that they each respond to a different frequency, by making the various frequencies of which the compound current is composed conform, respectively, to the critical frequencies of the various resonator-circuits a current of different frequency may be excited in each of the said branch or resonator circuits which is not materially interfered with by currents in the other branches.

I have already adverted to the fact that for the purposes of this invention it is not necessary that separate vibratory electromotive forces and currents shall be employed and that an equivalent compound electromotive force may be impressed upon the main circuit. Such a compound current or electromotive force is virtually a plurality of simple harmonic currents or electromotive forces simultaneously impressed, and for convenience I shall hereafter in this specification adopt the term "multiperiodic currents and electromotive forces" as one applicable to either case. Such multiperiodic currents and electromotive forces can be produced not only in the plan indicated above, but also either by separate generators of the ordinary type, each contributing a current and electromotive force at a particular frequency, or by a single generator designed to give electromotive-force waves of the desired form. Such generators can readily be constructed by those skilled in the art, and I do not consider it necessary to discuss them in detail in this specification, it being sufficient to state that these multiperiodic currents are readily separated or analyzed into their simple harmonic components by electrical resonator-circuits, such as those described or about to be described.

It is evidently possible and will in some cases be advisable to use a machine producing an electric wave of a compound form— such, for example, as that indicated by the full line in Fig. 2—as in a case when the operation by the same generator of two resonator-circuits attuned to different pitches is required.

In Fig. 3 the several resonator-circuits 30, 31, 32, 33, 34, 35, and 36 are serially, but inductively, associated with the main signaling-circuit A A² by means of induction coils or transformers I I², &c., whose primary windings $p\ p^2$, &c., are in series in the main line and whose secondary windings $s\ s^2\ s^3$, &c., are respectively in the said resonator-circuits. The circuits 30, 31, and 32 are indicated as containing variable-resistance transmitting instruments T and circuits 34, 35, and 36 as being provided with translating devices or receivers—such as telephones, polarized bells, motors, &c.—telephones being indicated in the drawing, and circuit 33 is provided with both a transmitter and a receiver. The several receivers $n$ may be made responsive each to the operation of some particular one of the transmitters. Thus the receiver $n$ of circuit 33 may be made responsive to transmitter T of circuit 30, $n^2$ of circuit 34 to transmitter T², $n^3$ in circuit 35 to T³, and $n^4$ in circuit 36 to T⁴ in circuit 33. The presence of a transmitter as well as a receiver in the circuit 33 may be considered as indicating that all of the resonator-circuits in like manner may be fitted with both classes of instrument and may be operated reciprocally.

The operation of the system illustrated is as follows: A multiperiodic current is impressed upon the main circuit A A², and the several simple harmonic components thereof experience an impedance in passing the primary windings $p\ p^2\ p^3$, &c., of the resonator-circuits, the magnitude of the said impedance depending in each case, according to well-known principles, on the impedance which the corresponding secondary winding and circuit offers to electromotive forces of its own particular frequency. Since the current of any given frequency which flows in a circuit depends on the impedance of the circuit to the electromotive-force vibrations of that frequency, we may say that the impedance offered by a given primary helix to current components of any given frequency depends on the current of that particular frequency induced by it in the secondary. The several secondary helices $s\ s^2\ s^3\ s^4$, &c., develop in their respective resonator-circuits, which initially are differently proportioned, as hereinbefore described, currents which are practically monoperiodic, and therefore any variation of the resistance of one of these secondary circuits will produce but very little effect on the impedance offered by its corresponding primary to any current components except such as correspond in frequency to the critical frequency of that particular resonator-circuit. By operating the variable-resistance transmitters included in the resonator-circuits at the various transmitter-stations, the various simple harmonic components of the multiperiodic current impressed on the main circuit A A² are correspondingly and selectively varied in intensity. These variations are respectively responded to by the various properly-attuned resonator-circuits at the receiving-stations, and the included signal-receiver, motor, or other appliance is thereby operated.

Fig. 4 discloses an arrangement for the selective operation of electrical devices in which a plurality of resonator-circuits are associated in parallel on a main or current-supply circuit. Circuits 30, 32, and 34 are in direct connection and circuits 31 and 33 in inductive connection with the mains. The several appliances are each indicated by the usual reference-letters. In some of the resonator-circuits 30, 31, and 32 are arranged variable-resistance transmitting devices T, T², and T³, and in the others 33 34 are included receivers or translating devices $n\ n^2$, of any desired character, as hereinbefore indicated. There is of course no reason why transmitting and receiving apparatus should not be included in the same resonator-circuits. Each of the resonator-circuits in which are situated the transmitter devices is so designed as to correspond to the same frequency as some one or more of the circuits including the receiving devices.

In the above examples I have spoken of transmitters which act by varying the resistance of the resonator-circuits, as these are in most general use and operate satisfactorily in their work of controlling the current in the main circuit. Transmitting devices which vary any or all of the other properties or magnitudes of the circuit—such as inductance or capacity—and embodying any convenient mode of varying these properties may, however, in accordance with this specification readily be used. For instance, we may vary the reluctance of the magnetic circuit of a coil included in the resonator-circuits or we may vary the number of sheets of a condenser included in said circuit or otherwise vary the capacity of such condenser.

Although in what has hereinbefore been stated I have made mention of resonator-circuits in general, it is not all such circuits which are available for use in the manner described. For the purposes of this invention it is desirable that these circuits have a very marked resonance for rates of electrical vibration within the range in which it is practicable to develop and distribute electric currents.

In order to have resonator-circuits decisive in their selective action, I find it desirable to have the resistance and capacity small and the inductance large. These limitations are relative, however, for when the critical frequency is high much more resistance can be tolerated in the resonant circuit than would be possible for a circuit with a low critical frequency. The normal resistance of such a circuit can therefore be varied within limits of considerable width. I may, however, state that for several resonator-circuits the proportions of inductance and capacity mentioned below are well adapted to be responsive to the frequencies placed opposite them respectively.

*Resonator Circuits.*

| No. | Effective inductance in henries. | Effective capacity in microfarads. | Critical frequency in complete alternations per second, approximately. |
|-----|----------------------------------|------------------------------------|------------------------------------------------------------------------|
| 1   | 1.0                              | 0.4                                | 250                                                                    |
| 2   | 0.25                             | 0.4                                | 500                                                                    |
| 3   | 0.25                             | 0.1                                | 1,000                                                                  |

The apparatus described but not claimed herein constitutes the subject-matter of a companion application, filed July 10, 1902, Serial No. 115,057.

I claim—

1. The method of selectively regulating and controlling the flow of vibratory electric currents simultaneously impressed upon a main line or signaling circuit, which consists in varying or adjusting one of the elements of a resonant circuit associated with said main line or signaling circuit, substantially as described.

2. The method of selectively regulating and controlling the flow of vibratory electric currents simultaneously impressed upon a main line or signaling circuit, which consists in varying or adjusting several of the elements of a resonant circuit associated with said main line or signaling circuit, substantially as described.

JOHN STONE STONE.

Witnesses:
THOMAS D. LOCKWOOD,
GEO. WILLIS PIERCE.